(12) United States Patent
Hong et al.

(10) Patent No.: US 7,314,893 B2
(45) Date of Patent: Jan. 1, 2008

(54) ACRYLIC COPOLYMERS WITH IMPROVED LOW TEMPERATURE PERFORMANCE

(75) Inventors: Sheng Hong, Plainsboro, NJ (US); Claude Granel, Paris (FR)

(73) Assignee: Arkema Inc., Philadelphia, PA (US)

( * ) Notice: Subject to any disclaimer, the term of this patent is extended or adjusted under 35 U.S.C. 154(b) by 276 days.

(21) Appl. No.: 11/145,859

(22) Filed: Jun. 6, 2005

(65) Prior Publication Data
US 2006/0276587 A1 Dec. 7, 2006

(51) Int. Cl.
*C08L 51/04* (2006.01)

(52) U.S. Cl. .................. 523/201; 523/202; 525/70; 525/87

(58) Field of Classification Search ........... 523/201, 523/202; 525/70, 87
See application file for complete search history.

(56) References Cited

U.S. PATENT DOCUMENTS

| | | |
|---|---|---|
| 4,034,013 A | 7/1977 | Lane |
| 4,096,202 A | 6/1978 | Farnham et al. |
| 4,883,481 A | 11/1989 | Blanchard |
| 5,360,865 A | 11/1994 | Aoyama et al. |
| 5,409,907 A | 4/1995 | Blase et al. |
| 5,612,413 A | 3/1997 | Rozkuszka et al. |
| 5,773,520 A | 6/1998 | Bertelo et al. |
| 6,331,580 B1 * | 12/2001 | Molnar ............ 523/201 |
| 6,809,151 B1 | 10/2004 | Lacroix et al. |
| 7,173,082 B2 * | 2/2007 | Ahn et al. ......... 524/458 |
| 2005/0119393 A1 | 6/2005 | Ahn et al. |

FOREIGN PATENT DOCUMENTS

EP 1 369 689 A1 12/2002

* cited by examiner

*Primary Examiner*—James J. Seidleck
*Assistant Examiner*—Olga Asinovsky
(74) *Attorney, Agent, or Firm*—Thomas F. Roland

(57) ABSTRACT

This invention relates to a core/shell impact modifier having as a core a copolymer or terpolymer having from 25 to 75 percent by weight of 2-ethylhexyl acrylate (2-EHA) monomer units with from 25 and 75 percent by weight of n-octyl acrylate (n-OA) monomer units. This core-shell impact modifier is used in performance polymers to improve low temperature impact performance.

9 Claims, No Drawings

ACRYLIC COPOLYMERS WITH IMPROVED LOW TEMPERATURE PERFORMANCE

FIELD OF THE INVENTION

This invention relates to a core/shell impact modifier having as a core a copolymer or terpolymer having 25 to 75 percent by weight of 2-ethylhexyl acrylate (2-EHA) monomer units with between 25 and 75 percent by weight of n-octyl acrylate (n-OA) monomer units. This core-shell impact modifier is used in engineering polymers to improve low temperature impact performance.

BACKGROUND OF THE INVENTION

Synthetic resins are widely used as engineering plastics in a variety of end-uses, such as building materials and automobile parts. The engineering plastics have good physical and chemical resistance, and are low cost. A disadvantage of some engineering plastics is that they have poor impact strength. Poor impact strength of these materials may be overcome by blending impact modifiers with the resins. Impact modifiers of the core-shell type provide a low-$T_g$ elastomeric core coated with a shell to improve handling and prevent clumping.

Many such additives are known, such as core/shell impact modifiers prepared by emulsion polymerization with a first stage or core of a polymer based on butadiene or on a poly(alkyl acrylate), and with one or more shells or second stages based on polymers which are mainly derived from methyl methacrylate, but which may also have polymer chains derived from vinyl aromatic monomers, such as styrene.

PVC plastics are described having a core/shell impact modifier having a 2-EHA/BA core in U.S. Pat. No. 5,612,413. The patent shows that a copolymer of a low $T_g$ (2-EHA) and high $T_g$ (BA) monomer can provide improved low-temperature performance.

U.S. Pat. No. 5,77,520 describes a core/shell impact modifier for improved low impact performance having an alkyl acrylate core, preferably $C_5$ to $C_8$ alkyl acrylates, blended with a terpolymer impact modifier. N-octyl acrylate is used in the examples.

U.S. Pat. No. 5,360,865 describes a polycarbonate resin having a core-shell impact modifier where the core contains at least 60 percent of a $C_6$ to $C_{10}$ alkyl acrylate. The preferred alkyl acrylates are n-octyl acrylate, 2-ethylhexyl acrylate and 6-methylheptyl acrylate. The use of a graftlinker and optionally a crosslinker in the core is also described. It is demonstrated that when the number of carbon atoms of an alkyl group in an alkyl ester used in a rubber polymer of the graft-copolymer is increased, the Brittle-Ductile transition of a PC resin containing the modifier can be further lowered.

Impact modification of polymers is a complicated phenomenon. Different resin types have different inherent mechanical properties and require different types of modifiers. For example, it is known that the best modifiers for rigid polystyrene are not the best ones for rigid polymethylmethacrylate or polycarbonate; and the best modifiers for semicrystalline polyolefins are not the best for semi-crystalline polyesters. The optimum toughness can only be achieved through a careful balance of many factors such as modifier particle size, particle size distribution, modifier response under static and dynamic stress environment, and modifier dispersion in the matrix. Polyesters have excellent solvent and chemical resistance and high temperature performance due to their semicrystalline morphology. Polyesters and their alloys with other polymers are widely used in engineering polymer applications.

It has been shown that linear acrylates can achieve better low temperature impact performance than branched acrylate in the core stage of impact modifier preparation. Specifically, a core with n-octyl acrylate can provide excellent low temperature impact toughness. However, an issue with n-octyl acrylate is that it is not widely available.

There is a need in the market for a low-temperature impact modifier with excellent impact toughening properties that is widely available for use in a wide variety of engineering plastics.

It has now been found that an acrylic impact modifier containing predominantly 2-EHA with minor amount of n-OA can provide significantly better low temperature impact performance than when the core is made entirely from 2-ethylhexyl acrylate. This observation is unexpected since both poly(2-ethylhexyl acrylate) and poly(n-octyl acrylate) have identical Tgs. It has also been found that when two monomers with identical Tg are copolymerized, the modifier can provide better toughness than if the modifier is made entirely from one of the modifiers.

SUMMARY OF THE INVENTION

It is an object of the invention to develop an impact modifier with 2-ethylhexyl acrylate as a major component and with improved low temperature impact performance over a homopolymer of 2-EHA.

It is a further object of the invention to provide a copolymer of 2-ethylhexyl acrylate and n-octyl acrylate having low temperature similar to or better than that of an n-octyl acrylate homopolymer.

It is a further objective of the invention to use a core/shell impact modifier having a 2-EHA/OA copolymer core for improving the low temperature impact properties of an engineering plastic.

The objectives of the invention are achieved, in accordance with the principles of a preferred embodiment of the invention, by an impact-modified engineering plastic comprising:

a) From 70 to 99 percent by weight of an engineering plastic selected from the group consisting of polyesters, polycarbonate, alkyl (meth)acrylate polymers and copolymers, acrylonitrile/butadiene/styrene terpolymers, acrylonitrile/styrene/acrylate copolymers, polycarbonates, methacrylate/butadiene/styrene copolymers, polystyrene, acrylonitrile/acrylate copolymers, acrylonitrile/methyl methacrylate copolymers, polyolefins, and poly(vinyl chloride), polyamides, polyetheresteramides, or alloys of the abovementioned polymers such as alloys of polycarbonates and of polyesters. The thermoplastic polymer can also be composed of a homopolymer of a vinylidene halide, such as 1,1-dichloroethylene or 1,1-difluoroethylene; and b) from 1-30 percent by weight of a core/shell impact modifier comprising from 70 to 90 percent by weight of a core comprising from 50 to 75 percent by weight of 2-ethyl hexyl acrylate units, and from 25 to 50 percent by weight of n-octyl acrylate units.

It is disclosed in this invention record that with minor amount of n-octyl acrylate as comonomer or n-octyl acrylate/n-butyl acrylate mixture as co-monomers, the low temperature impact performance of can be significantly improved. The resin polymer can be polyesters, PBT, PET, PC, polyacetal, PVC, CPVC, PVDF, polyamides and blends thereof.

DETAILED DESCRIPTION OF THE INVENTION

The invention relates to an impact modified engineering plastic having a core/shell impact modifier where the core is a copolymer of 2-ethylhexyl acrylate and n-octyl acrylate. The term "copolymer", as used herein, refers to a core polymer formed from 2-EHA, n-OA and optionally one or more other monomers. The term "terpolymer", as used herein, refers to a core polymer containing three or more different monomeric units.

The impact modifier is a core/shell impact modifier made by a multi-stage graft process. The core polymer is produced from 15 to 85 percent by weight of 2-ethylhexyl acrylate monomer, preferably 25 to 75 percent, and most preferably 50-75 percent; and from 15 to 75 percent by weight of n-octyl acrylate, preferably 25-75 percent, and most preferably from 25 to 50 percent. Other vinyl monomers at up to 25 percent by weight may optionally be copolymerized with the 2-EHA and n-OA. Particularly useful are $C_1$ to $C_6$ alkyl acrylates, such as ethyl acrylate, n-propyl acrylate, n-butyl acrylate, amyl acrylate, 2-methylbutyl acrylate, 2-methylbutyl acrylate, n-hexyl acrylate, and mixtures thereof. In one preferred embodiment, butyl acrylate is used at a level of from 5 to 10 weight percent to form a terpolymer of 2-EHA/n-OA/n-BA. The small amount of n-BA used as a third-monomer in the polymerization of core provides a good balance between impact performance and economics. Surprisingly it was found that using as little as 25 percent of nOA (having a similar $T_g$) provides a core having low impact properties similar to a core of pure nOA.

The core polymer will contain low levels of both crosslinker and graftlinker. By using very low concentration of crosslinker and graftlinker, we can minimize crosslink density and achieve optimum performance in polyesters and blends thereof. The crosslinker and graftlinker independently will be present in the copolymer at from 0.1 to 2.0 percent, and preferably from 0.2 to 1.5 percent by weight based on total monomer.

The crosslinking agent useful for forming the core copolymer may be chosen from derivatives possessing at least two double bonds of the vinyl type or alternatively possessing one or a number of double bonds of the vinyl type and at least one double bond of the allyl type. Preferred crosslinking agents contain a majority of double bonds of the vinyl type. Examples of crosslinking agents include, but are not limited to divinylbenzenes, polyalcohol (meth)acrylates such as trimethylolpropane triacrylate or trimethacrylate, allyl acrylate or methacrylate, alkylene glycol diacrylates or dimethacrylates having 2 to 10 carbon atoms in the alkylene chain and in particular ethylene glycol diacrylate or dimethacrylate, 1,4-butanediol diacrylate or dimethacrylate or 1,6-hexanediol diacrylate or dimethacrylate, or polyoxyalkylene glycol diacrylate or dimethacrylate of formula $CH_2=Cx\text{-}COO\text{---}[C_nH_{2n}O]_n\text{---}(O)CX=CH_2$ in which X represents a hydrogen atom or the methyl radical, n is an integer ranging from 2 to 4 and p is an integer ranging from 2 to 20 and in particular polyoxyethylene glycol diacrylate or dimethacrylate in which the polyoxyethylene radical has a molecular mass of approximately 400 (abovementioned formula with n=2 and p=9).

According to the present invention, the grafting agent used to form the copolymer is selected from derivatives possessing at least two double bonds of the allyl type or alternatively possessing one or a number of double bonds of the allyl and at least one double bond of the vinyl type. Examples of grafting agents include, but are not limited to, diallyl maleate, diallyl itaconate, allyl methacrylate or acrylate, triallyl cyanurate, triallyl isocyanurate, diallyl terephthalate or triallyl trimesate.

The shell polymer makes up from 10 to 25 weight percent of the impact modifier, and preferably from 15 to 25 percent. The shell may be any higher $T_g$ polymer of copolymer, as known in the art for use in core/shell impact modifiers. In a preferred embodiment, the shell is polymethylmethacrylate or a copolymer containing at least 85 percent by weight of methylmethacrylate. For modification of polyesters, polyamide or alike, small amounts of reactive functionality are typically incorporated in the shell stage. Such reactive monomer can be glycidyl (meth)acrylate, (meth)acrylic amide, (meth)acrylic acid, maleic anhydride and alike. Small amounts of other types comonomers, such as crosslinker, graftlinker or other polymerizable co-monomers may also be included in the shell stage.

One process for forming the core-shell impact modifier comprises the preparation, in a first state, of a crosslinked core composed of a nucleus and of a covering and then, in a second stage, a poly(alkyl methacrylate) shell is grafted onto the said crosslinked core obtained in the first stage.

According to a preferred method, the crosslinked core, composed of a nucleus and of a covering, is prepared and the grafting operation is carried out by using emulsion polymerization techniques. In this case, the following procedure can be used.

In a first stage, an emulsion is prepared which contains, per part by weight of monomers to be polymerized, 1 to 10 parts of water, 0.001 to 0.03 parts of an emulsifying agent, a minor portion of acrylic monomer or monomer mixtures as defined above to be polymerized in order to form the said core and at least one polyfunctional crosslinking agent. The reaction mixture thus formed is stirred and maintained at a temperature ranging from 45° C. to 90° C. and preferably at a temperature in the region of 60° C. to 85° C. 0.001 to 0.5 parts of a catalyst (initiator) which generates free radicals is then added and the reaction mixture thus formed is maintained at a temperature of, for example, between ambient temperature and 95° C. and with stirring for a period sufficient to obtain a virtually complete conversion of the monomers. The major portion of n-alkyl acrylate or of the mixture of alkyl acrylates and the grafting agent, as well as, at the same time, 0.001 to 0.005 part of a catalyst which generates free radicals, are then added semi-continuous to the phase thus obtained to achieve desired particle size.

In a second stage, the said core is grafted with alkyl methacrylates or mixtures. To do this, an appropriate amount of the said methacrylate and sometimes minor amount of reactive functional monomers are added to the reaction mixture resulting from the first stage, in order to obtain a grafted copolymer containing the desired content of grafted chains, as well as, if appropriate, additional amounts of emulsifying agent and of a radical catalyst also within the ranges defined above, and the mixture thus formed is maintained at a temperature within the abovementioned range, with stirring, until virtually complete conversion of the grafting monomers is obtained.

Use may be made, as emulsifying agent, of any one of the known surface-active agents, whether anionic, nonionic or even cationic. In particular, the emulsifying agent may be chosen from anionic emulsifying agents, such as sodium or potassium salts of fatty acids, in particular sodium laurate, sodium stearate, sodium palmitate, sodium oleate, sodium or potassium salts of sulfosuccinic esters, sodium or potassium salts of alkyl(aryl)sulfonic acids, in particular sodium dodecylbenzenesulfonate, and sodium or potassium salts of fatty monoglyceride monosulfonates, or alternatively from non-ionic surfactants, such as the reaction products of ethylene oxide and of alkylphenol or of aliphatic alcohols, alkylphenols. Use may also be made of mixtures of such surface-active agents, if need be.

The catalysts capable of being employed, both in the abovementioned first emulsion polymerization stage and in the abovementioned second emulsion polymerization stage, are compounds which give rise to free radicals under the temperature conditions chosen for the polymerization. These compounds can in particular be peroxide compounds, such as hydrogen peroxide; alkali metal persulphates and in particular sodium or potassium persulphate; ammonium persulphate; percarbonates; peracetates, perborates; peroxides such as benzoyl peroxide or lauroyl peroxide; or hydroperoxides such as cumene hydroperoxide, diisopropylbenzene hydroperoxide, para-menthane hydroperoxide or tert-butyl hydroperoxide.

However, it is preferable to use catalytic systems of redox type formed by the combination of a peroxide compound, for example as mentioned above, with a reducing agent, in particular such as alkali metal sulphite, alkali metal bisulphite, sodium formaldehyde sulphoxylate ($NaHSO_2HCHO$), ascorbic acid, glucose, and in particular those of the said catalytic systems which are water-soluble, for example potassium persulphate/sodium metabisulphite or alternatively diisopropylbenzene hydroperoxide/sodium formaldehyde sulphoxylate.

It is also possible to add, to the polymerization mixture of one and/or other of the stages, chain-limiting compounds, and in particular mercaptans such as tert-dodecyl mercaptan, isobutyl mercaptan, n-octyl mercaptan, n-dodecyl mercaptan or isooctyl mercaptopropionate, for the purpose of controlling the molecular mass of the core and/or of the chains grafted onto the nucleus, or alternatively compounds such as phosphates, for the purpose of controlling the ionic strength of the polymerization mixture.

The reaction mixture can be spray-dried or coagulated by addition of salt or acid to obtain impact modifier powders that are easy to handle and transport. The procedure of such operation is well known in the art.

The impact modifier is blended into an engineering plastic at from 1 to 30 weight percent, and preferably from 15 to 30 weight percent, based on the weight of the total compounds. Engineering plastics useful in the present invention include, but are not limited to polyesters such as poly(butylene terephthalate) and poly(ethylene terephthalate), polycarbonate, alkyl (meth)acrylate polymers and copolymers, acrylonitrile/butadiene/styrene terpolymers, acrylonitrile/styrene/acrylate copolymers, polycarbonates, methacrylate/butadiene/styrene copolymers, polystyrene, acrylonitrile/acrylate copolymers, acrylonitrile/methyl methacrylate copolymers, polyolefins, and poly(vinyl chloride), polyamides, polyetheresteramides (PEBAX®), or alloys of the abovementioned polymers such as alloys of polycarbonates and of polyesters, such as XENOY®. The thermoplastic polymer can also be composed of a homopolymer of a vinylidene halide, such as 1,1-dichloroethylene or 1,1-difluoroethylene.

The composition according to the invention can be prepared by any method which makes it possible to produce a homogeneous mixture containing a thermoplastic polymer, the is impact additive according to the invention and optionally other additives. It is possible, for example, to dry-mix the ingredients constituting the resin composition, then to extrude the resulting mixture and to reduce the extrudate to pellets. When the thermoplastic polymer is obtained by emulsion polymerization, it may be convenient to mix the emulsion containing the additive according to the invention with the emulsion of the thermoplastic polymer and to treat the resulting emulsion in order to separate therefrom the solid product which it contains, as described above with respect to the separation of the additive.

The additives, other than the impact additive, which may optionally be present in the resin compositions according to the invention are in particular those such as pigments, dyes, plasticizers, antioxidants, heat stabilizers, processing additives or lubricants.

EXAMPLES

Examples 1 (Comparative)

Synthesis of the Core/Shell Impact Modifier

The following procedure was used to synthesize a multi-stage impact modifier having an elastomeric core and a hard shell.

The ratio of the two stages was 75 core//25 shell.
The compositions of the two stages were
Stage 1: 98/1/1 2-EHA/BDDA/DAM
Stage 2: 95/5 MMA/GMA
where,
MMA=methyl methacrylate
BDDA=butanediol diacrylate
DAM=diallyl methacrylate
GMA=glycidyl methacrylate A monomer charge consisting of 10% of Stage 1 was emulsified in water, using sodium dodecyl sulfosuccinate as the emulsifier and using potassium carbonate to control the pH. This mixture was polymerized using potassium persulfate at elevated temperatures. The remaining portion of Stage 1 was then added to the preformed polymer emulsion and was polymerized using potassium persulfate at elevated temperatures controlling the amount of soap added to prevent the formation of a significant number of new particles. The Stage 2 monomers were then added and polymerized using CRO/CB as redox initiator pair at elevated temperatures controlling the amount of soap added to prevent the formation of a significant number of new particles. The amount of surfactants added was controlled in such a way that the final particle size is around 300 nm.

Examples 2-12

Examples 2-12 are prepared in a similar manner to those of Examples 1-5, using the monomer ratios of Table 1.

The preparation of a resin composition based on poly (butylene terephthalate)(PBT) is described below and the impact strength characteristics of test specimens manufactured from this resin composition are given.

75 parts of a poly(butylene terephthalate) homopolymer (Celanex 1700A, sold by the company Hoechst Celanese), 25 parts of an impact additive prepared according to the Examples 1-12 The mixture is dried for at least 10 hours under a vacuum of 1 bar at 80° C. Compounding and extrusion is carried out under the typical conditions recommended by the resin supplier.

The test specimens for the Izod impact tests are prepared by injection moulding the granules obtained above on a Visumat 5000 injection press. These granules are dried for at least 10 hours under a vacuum of 1 bar at 80° C. Injection is carried out under the typical conditions recommended by the resin supplier.

The notched test specimen were prepared according to ASTM standard. The results obtained are presented in Tables 1. As shown in the table, example 8 showed the best low temperature impact performance at −30° C. with only 25% n-octyl acrylate as comonomer, the performance is even better than if 100% n-octyl acrylate is used.

TABLE 1

| Ex. | Synthesis Conditions | | | | Impact Properties In PBT (ft-lb/in) | |
|---|---|---|---|---|---|---|
| | EHA, % | n-OA, % | BDDA, % | DAM % | Room Temp | −30° C. |
| 1 (comp) | 100 | 0 | 1.0 | 1.0 | 100% D(19) | 0% D(2) |
| 2 | 70 | 30 | 1.0 | 1.0 | 100% D(19) | 0% D(2) |
| 3 | 50 | 50 | 1.0 | 1.0 | 100% D(19) | 14% D(5/3) |
| 4 | 30 | 70 | 1.0 | 1.0 | 100% D(19) | 50% D(5/3) |
| 5 (comp) | 0 | 100 | 1.0 | 1.0 | 100% D(19) | 30% D(5/3) |
| (comp) | 100 | 0 | 0.1 | 0.5 | 100% D(11) | 44% D(12/4) |
| (comp) | 90 | 10 | 0.1 | 0.5 | 100% D(12) | 33% D(12/5) |
| 8 | 75 | 25 | 0.1 | 0.5 | 100% D(11) | 100% D(17) |
| 9 | 50 | 50 | 0.1 | 0.5 | 100% D(9) | 100% D(16) |
| 10 | 30 | 70 | 0.1 | 0.5 | 100% D(11) | 100% D(16) |
| 11 (comp) | 0 | 100 | 0.1 | 0.5 | 100% D(11) | 100% D(15) |

What is claimed is:

1. An impact-modified engineering plastic comprising:
   a) from 70 to 99 percent by weight of an engineering plastic selected from the group consisting of polyesters, alkyl (meth)acrylate polymers and copolymers, acrylonitrile/butadiene/styrene terpolymers, acrylonitrile/styrene/acrylate copolymers, polycarbonates, methacrylate/butadiene/styrene copolymers, polystyrene, acrylonitrile/acrylate copolymers, acrylonitrile/methyl methacrylate copolymers, polyolefins, poly(vinyl chloride), polyamides, polyetheresteramides, a homopolymer of a vinylidene halide, and alloys thereof; and
   b) from 1-30 percent by weight of a core/shell impact modifier comprising
      1) from 70 to 90 percent by weight of an elastomeric core polymer comprising:
         (a) from 50 to 85 percent by weight of 2-ethyl hexyl acrylate (2-EHA) units, and from 15 to 50 percent by weight of n-octyl acrylate (n-OA) units;
         (b) from 0.1 to 2.0 percent by weight of at least one crosslinking agent; and
         (c) from 0.1 to 2.0 percent by weight of at least one graftlinking agent; and
      2) from 10 to 30 percent by weight of a shell polymer.

2. The impact modified engineering plastic of claim 1 wherein the shell polymer of the core/shell impact modifier comprises:
   a) from 80% to 100% by weight of methacrylate units and from 0% to 20% styrenic units and from 0% to 10% acrylate units;
   b) from 0 to 5% by weight of one or more crosslinking agent; and
   c) from 0 to 10% by weight of a (meth)acrylate units containing glycidyl; alcohol; amine or acid functionality.

3. The impact modified engineering plastic of claim 1 wherein the engineering plastic is polybutylene terephthlate or polyethylene terephthlate.

4. The impact modified engineering plastic of claim 1 wherein the engineering plastic is a polymer alloy containing polybutylene terephthlate or polyethylene terephthlate.

5. The impact modified engineering plastic of claim 1 wherein said impact modifier core comprises from 50 to 75 percent by weight of 2-EHA monomer units.

6. The impact modified engineering plastic of claim 1 wherein said core further comprises from 1 to 25 weight percent of $C_1$ to $C_6$ alkyl acrylate monomer units.

7. The impact modified engineering plastic of claim 6, wherein said core comprises from 5 to 20 weight percent of butyl acrylate.

8. The impact modified engineering plastic of claim 1 wherein said core comprises from 0.2 to 1.5 percent by weight of both a crosslinker and a graftlinker.

9. The impact modified engineering plastic of claim 1 comprising from 15-30 percent by weight of a core/shell impact modifier.

* * * * *